(12) United States Patent
Zhang et al.

(10) Patent No.: US 10,839,508 B2
(45) Date of Patent: Nov. 17, 2020

(54) INTEGRATED CIRCUIT IMAGE ALIGNMENT AND STITCHING

(71) Applicant: SRI International, Menlo Park, CA (US)

(72) Inventors: David Zhang, Belle Mead, NJ (US); Sek Meng Chai, Princeton, NJ (US); Erik Matlin, San Jose, CA (US)

(73) Assignee: SRI International, Menlo Park, CA (US)

( * ) Notice: Subject to any disclaimer, the term of this patent is extended or adjusted under 35 U.S.C. 154(b) by 58 days.

(21) Appl. No.: 16/390,885

(22) Filed: Apr. 22, 2019

(65) Prior Publication Data

US 2020/0302584 A1 Sep. 24, 2020

Related U.S. Application Data

(60) Provisional application No. 62/821,557, filed on Mar. 21, 2019.

(51) Int. Cl.
*G06T 7/00* (2017.01)
*G06T 7/33* (2017.01)
(Continued)

(52) U.S. Cl.
CPC .............. *G06T 7/001* (2013.01); *G06K 9/03* (2013.01); *G06K 9/6256* (2013.01); *G06T 7/248* (2017.01);
(Continued)

(58) Field of Classification Search
CPC ......... G06T 7/001; G06T 7/337; G06T 7/248; G06T 2200/32; G06T 11/60;
(Continued)

(56) References Cited

U.S. PATENT DOCUMENTS 8,331,726 B2 * 12/2012 Stellari ............... H04N 5/2259
382/284
9,488,984 B1 * 11/2016 Williams ............. G06K 9/2036
(Continued)

OTHER PUBLICATIONS

Nister et al., "Visual Odometry," Proc. IEEE Conf. Computer Vision and Pattern Recognition (CVPR'04), 2004, 8 pp. (Applicant points out, in accordance with MPEP 609.04(a), that the year of publication, 2004, is sufficiently earlier than the effective U.S. filing date, so that the particular month of publication is not in issue.)

(Continued)

*Primary Examiner* — Ali Bayat
(74) *Attorney, Agent, or Firm* — Shumaker & Sieffert, P.A.

(57) ABSTRACT

In general, techniques are described for processing a set of high-resolution images of an integrated circuit, the images captured at different locations with respect to the integrated circuit, to automatically align and "stitch" the set of high-resolution images into a larger composite image. For example, an imaging system as described herein may use sampled feature points distributed across different grid tiles within overlap regions for pairs of images to match feature points to inform the alignments of a pair with respect to each image in the pair. The system may in some cases further apply a bundle adjustment to iteratively align and refine the alignment results for each image in a set of images being processed. In some examples, the bundle adjustment is a best-fit adjustment based on minimizing the net error associated with the alignment of the set of images.

20 Claims, 11 Drawing Sheets

(51) Int. Cl.
*G06T 11/60* (2006.01)
*G06K 9/62* (2006.01)
*G06T 7/246* (2017.01)
*G06K 9/03* (2006.01)

(52) U.S. Cl.
CPC .............. *G06T 7/337* (2017.01); *G06T 11/60* (2013.01); *G06T 2207/10061* (2013.01); *G06T 2207/20081* (2013.01); *G06T 2207/20084* (2013.01); *G06T 2207/30148* (2013.01)

(58) Field of Classification Search
CPC . G06T 2207/10061; G06T 2207/20081; G06T 2207/20084; G06T 2207/30148; G06K 9/03; G06K 9/6256; G06K 2009/2045
USPC .......................................................... 382/151
See application file for complete search history.

(56) References Cited

U.S. PATENT DOCUMENTS

| | | | |
|---|---|---|---|
| 2006/0018547 | A1* | 1/2006 | Ouchi ....................... G06T 7/30 382/190 |
| 2007/0288141 | A1 | 12/2007 | Bergen et al. |
| 2018/0060682 | A1* | 3/2018 | Cho .................... G06K 9/00771 |
| 2018/0253875 | A1* | 9/2018 | Gorur Sheshagiri ....................... G06T 3/0081 |
| 2019/0082103 | A1* | 3/2019 | Banerjee ................... G06T 7/33 |
| 2019/0318453 | A1* | 10/2019 | Jung ..................... G06T 3/4038 |

OTHER PUBLICATIONS

Zhang et al., "Fast, Full Chip Image Stitching of Nanoscale Integrated Circuits," Defense Technical Information Center, AD1075372, Mar. 25, 2019, 5 pp.

* cited by examiner

INTEGRATED CIRCUIT IMAGE ALIGNMENT AND STITCHING

RELATED APPLICATIONS

This application claims the benefit of U.S. Provisional Application No. 62/821,557, filed Mar. 21, 2019, which is incorporated by reference herein in its entirety.

GOVERNMENT LICENSE RIGHTS

This invention was made with Government support under FA8650-15-C-9111 awarded by the United States Air Force. The Government has certain rights in the invention.

TECHNICAL FIELD

This disclosure generally relates to image processing and, more specifically, to image alignment.

BACKGROUND

Imagery processing systems may store and manage imagery (e.g. image files), and may enable such imagery to be viewed, edited, processed, analyzed, tagged, categorized, and the like. For example, a microscope, such as a scanning electron microscope, may have an image-capture device configured to capture high-resolution images of microscopic surfaces and transfer the images to a processing system.

SUMMARY

In general, techniques are described for processing a set of high-resolution images of an integrated circuit, the images captured at different locations with respect to the integrated circuit, to automatically align and "stitch" the set of high-resolution images into a larger composite image. For example, an imaging system as described herein may use sampled feature points distributed across different grid tiles within overlap regions for pairs of images to match feature points to inform the alignments of a pair with respect to each image in the pair. The system may in some cases further apply a bundle adjustment to iteratively align and refine the alignment results for each image in a set of images being processed. In some examples, the bundle adjustment is a best-fit adjustment based on minimizing the net error associated with the alignment of the set of images and may computed by solving an optimization problem that is weighted by the number of matched features among the images.

The techniques may provide one or more technical advantages that facilitate one or more practical applications. For example, by sampling the feature points across grid tiles within the overlap regions, the techniques may facilitate sufficient distribution of unique feature points for comparison between pairs of images. Moreover, in some cases, the use of bundle adjustment may address and resolve large numbers of seams that may otherwise appear in a composite image being generated by aligning a set of images.

In one example, the disclosure is directed to a method of stitching images to generate a composite image of an object, comprising: by a computing system, for each pair of two or more pairs of the images: partitioning a first overlap region of a first image of the pair into a first plurality of grid tiles and partitioning a second overlap region of a second image of the pair into a second plurality of grid tiles, the first overlap region and the second overlap region being overlapping regions of the first image and the second image; extracting at least one feature point from each of the first plurality of grid tiles and at least one feature point from each of the second plurality of grid tiles, wherein the feature point defines a feature on an image, the feature being on a submicron or nanoscale level; determining corresponding feature points between the at least one feature point of the first overlap region and the at least one feature point of the second overlap region; and aligning the first image with the second image based on the corresponding feature points to determine at least one transformation matrix for the pair for transforming the first overlap region of the first image to the second overlap region of the second image; computing, by the computing system based on the respective at least one transformation matrices for the two or more pairs, global coordinates for each of the images by performing a bundle adjustment for at least two of the two or more pairs of the images to reduce a net error associated with the alignment of the images; stitching, by the computing system, the images based on the respective global coordinates for the images to generate the composite image; and outputting, by the computing system, at least one of the composite image and the respective global coordinates for the images.

In another example, the disclosure is directed to a system. The system includes an image-capture device configured to capture images of an integrated circuit; and a computation engine executing on one or more processors and configured to, for each pair of two or more pairs of the images: partition a first overlap region of a first image of the pair into a first plurality of grid tiles and partition a second overlap region of a second image of the pair into a second plurality of grid tiles, the first overlap region and the second overlap region being overlapping regions of the first image and the second image; extract at least one feature point from each of the first plurality of grid tiles and at least one feature point from each of the second plurality of grid tiles, wherein the feature point defines a feature on an image, the feature being on a submicron or nanoscale level; determine corresponding feature points between the at least one feature point of the first overlap region and the at least one feature point of the second overlap region; and align the first image with the second image based on the corresponding feature points to determine at least one transformation matrix for the pair for transforming the first overlap region of the first image to the second overlap region of the second image. The computation engine is further configured to compute, based on the at least one transformation matrices for the two or more pairs, global coordinates for each of the images by performing a bundle adjustment for at least two of the two or more pairs of the images to reduce a net error associated with the alignment of the images. The computation engine is further configured to stitch the images based on the respective global coordinates for the images to generate a composite image. The computation engine is further configured to output at least one of the composite image and the respective global coordinates for the images.

In another example, the disclosure is directed to a computer readable storage medium containing instructions. The instructions, when executed by at least one processor of a computing device, cause one or more processors to execute a computation engine configured to: for each pair of two or more pairs of images of an integrated circuit: partition a first overlap region of a first image of the pair into a first plurality of grid tiles and partition a second overlap region of a second image of the pair into a second plurality of grid tiles, the first overlap region and the second overlap region being overlapping regions of the first image and the second image;

extract at least one feature point from each of the first plurality of grid tiles and at least one feature point from each of the second plurality of grid tiles, wherein the feature point defines a feature on an image, the feature being on a submicron or nanoscale level; determine corresponding feature points between the at least one feature point of the first overlap region and the at least one feature point of the second overlap region; and align the first image with the second image based on the corresponding feature points to determine at least one transformation matrix for the pair for transforming the first overlap region of the first image to the second overlap region of the second image. The instructions further cause the one or more processors to execute the computation engine to: compute, based on the respective at least one transformation matrices for the two or more pairs, global coordinates for each of the images by performing a bundle adjustment for at least two of the two or more pairs of the images to reduce a net error associated with the alignment of the images; stitch the images based on the respective global coordinates for the images to generate the composite image; and output at least one of the composite image and the respective global coordinates for the images.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

Like symbols refer to like elements throughout the figures and the text.

DETAILED DESCRIPTION

Figure 1:
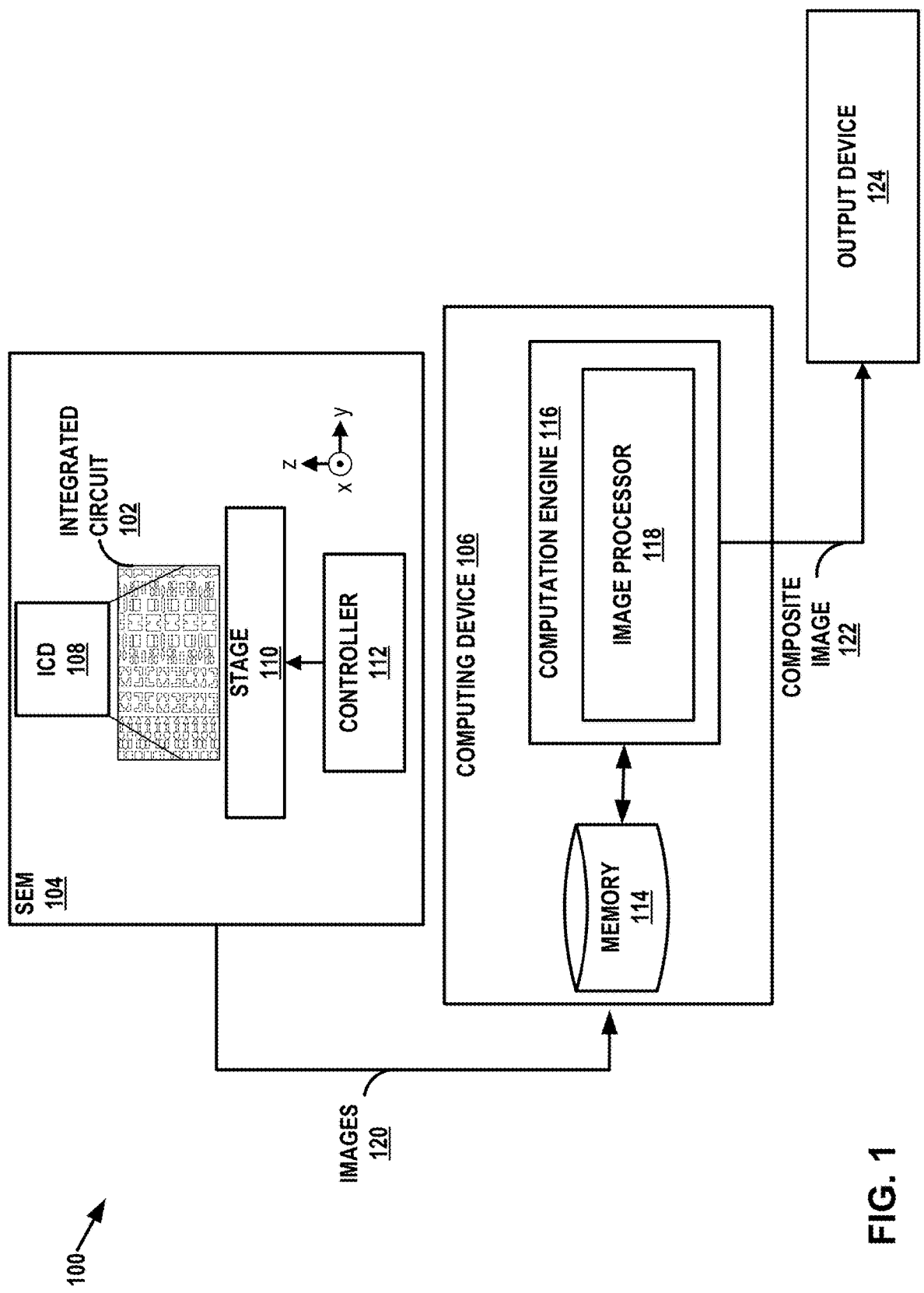
FIG. 1 is a block diagram illustrating an example system for processing high-resolution images of an integrated circuit.

Large area de-processing and nanometer scale imaging tools for integrated circuits, or "chips," are now available. For example, a plasma source focused ion beam scanning electron microscope (FIB-SEM) approach can delayer a large chip area by removing integrated circuit materials. However, defect validation in failure analysis cases and anti-tampering verification of state-of-art integrated circuits can only be performed in isolation with limited scope and speed in analysis. Full scale analyses of the whole integrated circuit die is problematic because, as minimum device feature size shrink and the number of devices multiply, the complexity of the image processing and the size of the global integrated circuit image data base poses an ever-challenging workload. Full scale integrated circuit analysis is important because state-of-art integrated circuits are particularly vulnerable to insertion of sparse modification that are difficult to identify and can compromise critical functionality and reliability.

The images can be low contrast, depending on the microscope settings. Techniques are described herein for improving contrasts of the images. Chip images have high resolution of several pixels per nanometer. Because circuit structures are very small (in the order of nanometers, for advanced microelectronics), each image is quite large. Consequently, the composite "mosaic" images generated by stitching together the images are equally large and are composed of many stitched seams. Techniques are described herein for using adjust the alignment of those many seams.

For large chip dies, the challenges in chip delayering is the consistency and robustness. That is, the surface quality needs to be good and uniform so that image quality does not degrade. Furthermore, the surface plane should be planar such that imaging can be consistent on a single integrated circuit layer. For example, a bevel delayering output would cut across multiple integrated circuit layers including metal and via layers. Furthermore, with non-planar transistors in small geometry transistors, ultra-planar delayering may be important to properly extract transistor circuitry from captured images.

The surface of an integrated circuit (IC), also referred to as a semiconductor chip, can be imaged to reveal the surface-level (or exterior) electrical interconnectivity of the circuit. Additionally, successive delayering of the chip can be performed to reveal the internal circuit structure below the exterior surface, and display the underlying gate-level netlist. The specific circuit functionality (e.g. adder, multiplier, A/D converter, etc.) may then be inferred from the gate-level netlist. Chip delayering may either be performed mechanically, such as via mechanical polishing, an ion-beam, or a chemical polish, or alternatively, through optical imaging. Such imaging may be captured, for example, with a high-power electron microscope, or with x-ray devices. The resulting images are often high-resolution, nanometer-scale pictures with detailed features, each individual image depicting a different section of the chip. The features can be on a submicron level or a nanoscale level, for instance. Accurate automatic alignment of the individual images into a single composite image of the entire chip can often be difficult, as the detailed features of the internal structure of the chip often display repetitive, edge-based patterns, resulting in ambiguous alignment along the various iterations of the patterns. Traditionally, stitching algorithms are designed for natural scenes, and natural images are visually more forgiving. In comparison, circuit images have edge-based content, and less texture/color content. Circuit images have more repetitive patterns, which makes traditional stitching algorithms fail to match corresponding points in overlap regions. For example, images where single directional interconnect wires dominate, picket-fence artifacts may make the image registration difficult, and in turn, produces poor quality stitches.

This disclosure further describes techniques for high-accuracy alignment of chip images into a composite image that enables robust stitching results across imaging and common delayering issues. Example processing pipelines and steps for stitching together high-resolution circuit images to form a composite mosaic image are described.

FIG. 1 is a block diagram illustrating an example system for processing high-resolution images of an integrated circuit, according to techniques of this disclosure. Imaging system 100 is configured to capture a set of high-resolution images of integrated circuit 102, accurately align the images, and stitch them into a single composite "mosaic" image.

Imaging system 100 includes a magnification device fitted with an image-capture device (ICD) 108, configured to capture high-resolution images, for example, at a nanometer scale. ICD 108 may represent a high-resolution camera. In the example of FIG. 1, a magnification device is depicted as scanning electron microscope (SEM) 104. In other examples, the magnification device and ICD 108 may include an x-ray, other electromagnetic-based optical magnification and imaging device, or other imaging system for capturing multiple high-resolution images of different parts of integrated circuit 102.

SEM 104 includes microscope stage 110. Stage 110 includes a planar surface on which integrated circuit 102 may be placed, so as to be positioned underneath (i.e., in the field of view of) image capture device 108. SEM 104 may include controller 112, configured to spatially move microscope stage 110 with respect to ICD 108, or alternatively, to spatially move ICD 108 with respect to microscope stage 110. For example, controller 112 may be configured to perform a horizontal translation (in the x-y plane) of microscope stage 110, exposing different sections of integrated circuit 102 to ICD 108. In some examples, controller 112 may also be configured to perform a rotation (in the x-y plane) of stage 110, or configured to move stage 100 vertically (in the z-axis direction) closer to or farther away from ICD 108, effectively scaling the resulting images. In some examples, controller 112 and/or microscope stage 110 may be configured to output a set of microscope stage coordinates, indicating an approximate relative position of stage 110 with respect to ICD 108. These stage coordinates at which an image is captured may be associated with the image.

Imaging system 100 includes computing device 106. Computing device 106 is configured to receive, via a wired or wireless link, a set of images 120 of integrated circuit 102 from ICD 108. Computing device 106 may include memory 114 configured to store images 120. In some examples, computing device 106 and ICD 108 are integrated within a single device.

Computing device 106 includes a computation engine 116, e.g., a memory for storing instructions and processing circuitry for executing such instructions, configured to execute an image processor 118 (detailed further in FIG. 2) to process images 120. Image processor 118 is configured to analyze, align, and "stitch" images 120 into a single composite image 122.

In accordance with techniques described in this disclosure, imaging system 100 may use sampled feature points distributed across different grid tiles within overlap regions for pairs of images 120 to match feature points to inform the alignments of a pair of images with respect to each image in the pair. As a result, the imaging system 100 may facilitate sufficient distribution of unique feature points for comparison between images in pairs of images 120. Imaging system 100 may in some cases further apply a bundle adjustment to iteratively align and refine the alignment results for each image in a set of images 120 being processed. The use of bundle adjustment by computing device 106 may address and resolve large numbers of seams that may otherwise appear in a composite image being generated by aligning images 120, and bundle adjustment generates global coordinates for each of images 120. Using the global coordinates for each of images 120, image processor 118 stitches the images 120 to generate a composite image 122. Computing device 106 may output composite image 122 to output device 124, which at least in some examples may represent a display screen or storage location, e.g., a disk or a local or remote storage server. In this way, computing device 106 may perform high-accuracy alignment of images 120 and stitching into a composite image 122, thus enabling robust stitching results across imaging and common delayering issues. In some cases, computing device 106 may output respective global coordinates for images 120 in addition to, or alternatively, to outputting composite image 122.

Figure 2:
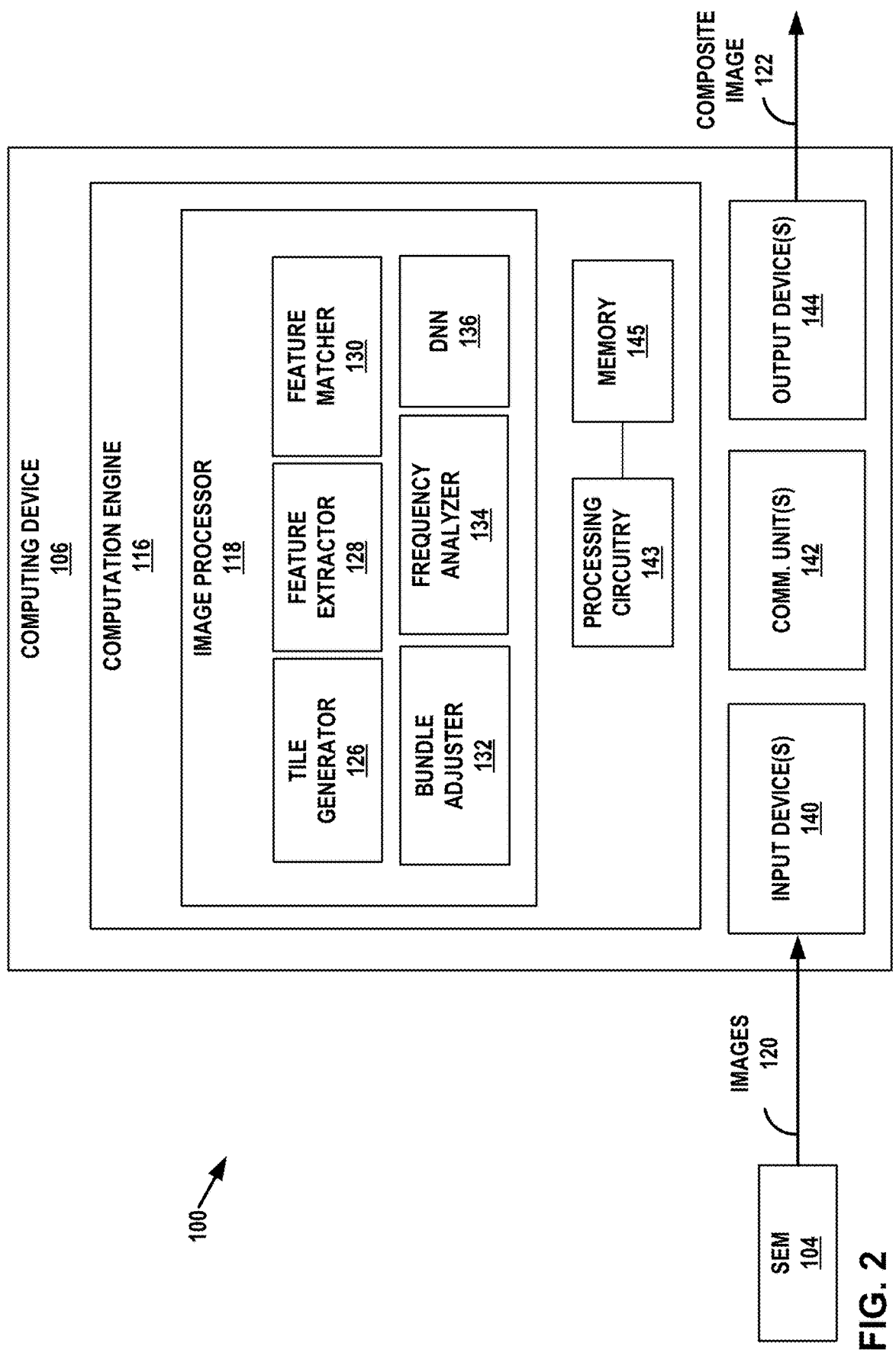
FIG. 2 is a block diagram illustrating an example system for processing high-resolution images of an integrated circuit, according to techniques of this disclosure.

FIG. 2 is a block diagram illustrating an example system, with example details, for processing high-resolution images of an integrated circuit, according to techniques of this disclosure. In this example instance, imaging system 100 includes computing device 106 configured to receive, via input device(s) 140, a set of high-resolution images 120 of the integrated circuit.

Memory 145 may store information for processing during operation of computation engine 116. In some examples, memory 145 may include temporary memories, meaning that a primary purpose of the one or more storage devices is not long-term storage. Memory 145 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 145, in some examples, also include one or more computer-readable storage media. Memory 145 may be configured to store larger amounts of information than volatile memory. Memory 145 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 145 may store program instructions and/or data associated with one or more of the modules described in accordance with one or more aspects of this disclosure.

Processing circuitry 143 and memory 142 may provide an operating environment or platform for computation engine 116, which may be implemented as software, but may in some examples include any combination of hardware, firmware, and software. Processing circuitry 143 may execute instructions and memory 142 may store instructions and/or data of one or more modules. The combination of processing circuitry 143 and memory 142 may retrieve, store, and/or execute the instructions and/or data of one or more applications, modules, or software. Processing circuitry 143 and memory 142 may also be operably coupled to one or more other software and/or hardware components, including, but not limited to, one or more of the components illustrated in FIG. 2.

Computation engine 116 may perform operations described using software, hardware, firmware, or a mixture of hardware, software, and firmware residing in and/or executing at computing device 320. Computation engine 116 may execute each of the module(s) with multiple processors or multiple devices. Computation engine 116 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more input devices 140 of computing device 106 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 144 may generate, transmit, or process output. Examples of output are tactile, audio, visual, and/or video output. Output devices 144 may include a display, sound card, video graphics adapter card, speaker, presence-sensitive screen, one or more USB interfaces, video and/or audio output interfaces, or any other type of device capable of generating tactile, audio, video, or other output. Output devices 144 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing device 106 may include a presence-sensitive display that may serve as a user interface device that operates both as one or more input devices 140 and one or more output devices 144.

One or more communication units 142 of computing device 106 may communicate with devices external to computing device 106 (or among separate computing devices of a distributed computing system for executing a distributed form of image processor 118) by transmitting and/or receiving data, and may operate, in some respects, as both an input device and an output device. In some examples, communication units 142 may communicate with other devices over a network. In other examples, communication units 142 may send and/or receive radio signals on a radio network such as a cellular radio network. Examples of communication units 142 include a network interface card (e.g. such as an Ethernet card), an optical transceiver, a radio frequency transceiver, a GPS receiver, or any other type of device that can send and/or receive information. Other examples of communication units 142 may include Bluetooth®, GPS, 3G, 4G, and Wi-Fi® radios found in mobile devices as well as Universal Serial Bus (USB) controllers and the like.

Computing device 106 includes image processor 118, which in the example includes one or more executable modules configured to analyze images 120, accurately align them, and generate a composite image 122 of the integrated circuit. While described here with respect to an integrated circuit, imaging system 100 may be applied to align and stitch high-resolution images of tissue, brain cells or other cells, or other subjects of microscope scanning for which multiple high-resolution images at different locations are captured.

For example, image processor 118 may include tile generator 126 (detailed further in FIG. 3, below). Tile generator 126 may select pairs of consecutive or proximate images from the set of images 120. Tile generator 126 may select pairs of images to process based on, for example, the order in which the images were captured, or in other examples, based on a corresponding set of microscope stage coordinates indicating the approximate position of microscope stage 110 (FIG. 1) when the images were captured and further indicating overlap of the pair of images. For each image in the pair of images, tile generator 126 may determine an approximate overlap region indicating a section of the first image that depicts a same area of the integrated circuit as in depicted in the overlap region of the second image. Tile generator 126 may then, for each image of the pair, partition the corresponding overlap region into a grid of tiles. For example, the overlap region may include a 3×3 grid of tiles, or a differently dimensioned grid of tiles (e.g., 3×4, 4×4, 100×100).

Image processor 118 may include feature extractor 128. Feature extractor 128 may identify one or more distinctive or distinguishable features from the overlap region in each image of the pair of images. In order to increase the accuracy of the image alignment by more evenly distributing the identified feature points, feature extractor 128 may identify at least one feature from each tile of the grid, as previously partitioned by tile generator 126, using a feature recognition algorithm. If feature extractor 128 is unable to identify at least one feature from every tile in an image or is unable to identify a sufficient number of features overall in the overlap region, tile generator 126 may expand the overlap regions of the pair of images, allowing for a larger number of pixels from which to search for feature points. Feature extractor 128 may then again attempt to identify the features from the expanded overlap regions. Alternatively or additionally, tile generator 126 may reduce the number of tiles in the grid to reduce the corresponding number of feature points that feature extractor 128 is to identify.

In some cases, feature extractor 128 first enhances the contrast and brightness in the overlap regions. These local enhancements may bring out the delayering noise as features in the non-circuit areas to improve image registration. For example, polishing marks from mechanical polish may be useful for alignment purposes. An original circuit image may be visually dark. A simple histogram equalization may not be able to enhance all of the edge information in the image. Instead, using a contrast normalization step for instance, feature extractor 128 can enhance all high frequency content in the image so as to provide strong feature points.

As noted above, using sampled feature points that are distributed across the overlap regions may improve alignment because (1) repeated patterns in circuit images can fool matching points, and (2) noisy patches on key dominant can throw off the ranking of features. Feature matcher 130 may use more highly-ranked features from each of the tiles to perform feature matching and alignment. Moreover, if there are repetitive circuit structures, then it can be difficult to disambiguate among the feature points. Also, if there are noisy patches (dust or artifacts introduced by chip delayering artifacts, electron discharge, then the list of feature points is skewed when considering the list as a whole). By sampling the feature points across tiles, feature extractor 128 enforces selectively sampling across the overlap regions such that there is sufficient distribution of unique feature points for comparison. The number of feature points per tile region can be set as a threshold based on noise level of the imagery or when the tile has few textures. That is, more points may be needed when the tiles have few features or are noisy.

Image processor 118 may include feature matcher 130. Once feature extractor 128 has identified a distributed set of distinguishing feature points in each tile of the overlap region in each of the pair of images, feature matcher 130 may attempt to match identified feature points in the first image with corresponding identified feature points in the second image. If feature matcher 130 is able to match a configurable threshold number of feature points between the two images, feature matcher 130 may align the two images relative to one another and record their alignment information as a pairwise registration indicating at least one transformation matrix required to translate, scale, or rotate one of the images to approximately match the overlap region of that image with the other image in the pair. The one or more transformation matrices may include at least one of a translation vector, a rotation matrix, or scale matrix. In some examples, feature matcher 130 may assign each pairwise registration a "confidence rating" indicating the number and/or relative distinctiveness of successfully matched feature points between the pair of images. For example, highly distinctive features identified in each overlap region of a pair of images and matched with one another increases the confidence rating of the pairwise registration and corresponding transformation matrices. As described in further detail below, bundle adjuster 132 may use the confidence ratings for pairwise registrations as weights in a bundle adjustment operation for adjusting the transformation matrices of multiple images.

Image processor 118 may include bundle adjuster 132 (detailed further in FIG. 4, below), in part to address seams in the composite image(s) to be generated. In some cases, one pairwise registration may initially conflict with one or more other pairwise registrations. For example, a pairwise registration between a first and a second image, and a pairwise registration between the second and a third image, may conflict with a pairwise registration between the third image and the first image. Bundle adjuster 132 may attempt to resolve such discrepancies (reducing the net error) by adjusting one or more of the pairwise registrations by an amount based on, for example, the number of discrepancies corresponding to a particular image or pair of images, the extent or degree of the alignment discrepancies, and/or the previously assigned confidence ratings for each pairwise registration.

Bundle adjuster 132 may apply one or more constraints. Constraints may include motion constraints and distance constraints, where "motion" refers to the displacement between two overlaps in translation, scale, and rotation. For example, bundle adjuster 132 may adjust the alignments by in part requiring that no translation vector for an image can exceed a maximum translation distance from the initial microscope stage coordinates of the image. In the event that bundle adjuster 132 determines that an adjustment for one or more images exceeds such a threshold, bundle adjuster may either assign that translation vector a low confidence rating or exclude that translation vector from the bundle adjustment altogether. Once bundle adjuster 132 has "averaged out" the discrepancies between the individual pairwise registrations, bundle adjuster 132 may stitch images 120 into composite image 122 based on the adjusted pairwise registrations, now indicative of "global" coordinates for the images. Computing device 106 may then output composite image 122 via output device(s) 144. In some examples, due to repetitive patterns within the circuits, ambiguous alignment along the pattern may result in bundle adjuster 132 generating more than one composite image 122 from the images 120. The motion and distance constraints may cause bundle adjuster 132 to exclude from outputting the one or more composite images 122 in which one or more translation vectors exceeds a maximum distance from the microscope stage coordinates, or alternatively, only outputs the composite image 122 in which translation vectors are collectively minimized (i.e., most consistent with the original microscope stage coordinates).

Image processor 118 may include one or more additional modules to further increase the accuracy and/or speed of the image-alignment process. For example, image processor 118 may include frequency analyzer 134 (detailed further in FIG. 5, below). Frequency analyzer 134 may compute a Fast Fourier Transform (FFT) for the images 120 to determine periodic features, such as repetitive patterns within the images. Frequency analyzer 134 may compare the frequency data to the results of bundle adjuster 132 to further refine the image alignment. For example, frequency analyzer 134 may exclude a determined image alignment (or prospective composite image) that does not match the frequency data.

Image processor 118 may also include a machine-learning system, such as deep neural network (DNN) 136 (detailed further in FIG. 6, below). DNN 136 may represent software executable by computation engine 116, or a combination of hardware and software. DNN 136 may receive a set of training data, learn a set of circuit structures or elements from the training data set, and align images 120 to match the learned circuit elements. In some examples, the training data set may include a library of images of integrated circuits. In other examples, the training data set may include frequency data indicating common patterns and structures appearing in the same figures to be aligned.

In some cases, feature matching for pairwise alignments may be unable to satisfy the threshold number of required features to satisfy the criteria. For example, a pair of images may have few feature points, small overlapping regions, or a large estimated motion. SEM 104 may include multiple ICDs 108 configured to simultaneously capture multiple images. Such images may be referred to as "subfields." The geometric alignment of these multiple images can be calibrated so that systematic misalignment can be estimated. Although the relative positions of these images drift as time goes by, the change is relatively small. Image processor 118 may use the systematic misalignment parameters if the error from the real-time alignment is larger than the drift error.

In order to stitch large regions, relative position between the SEM 104 and integrated circuit 102 may need to change. In some examples, SEM 104 is kept still and integrated circuit 102 on stage 110 moves. There will be a systematic error related to the direction of the stage 110 motion to the alignment between two microscope images. If motions between two microscope captures are poor, image processor 118 may replace the alignment from some prior information (e.g., an average motion between all neighbor alignments in the same stage moving direction, etc.). Image processor 118 can use system calibrations of SEM 104 in order to do small-scale alignments for images for SEM 104, e.g., to account for stage 110 change errors, image process 118 may use previously-aligned images as a pattern and use that pattern to replace the current failed alignments. The systematic misalignment due to stage errors is relatively larger but is useful. In this way, image processor 118 may still facilitate image alignment even where few feature points are available for pairwise matching, for instance.

Figure 3:
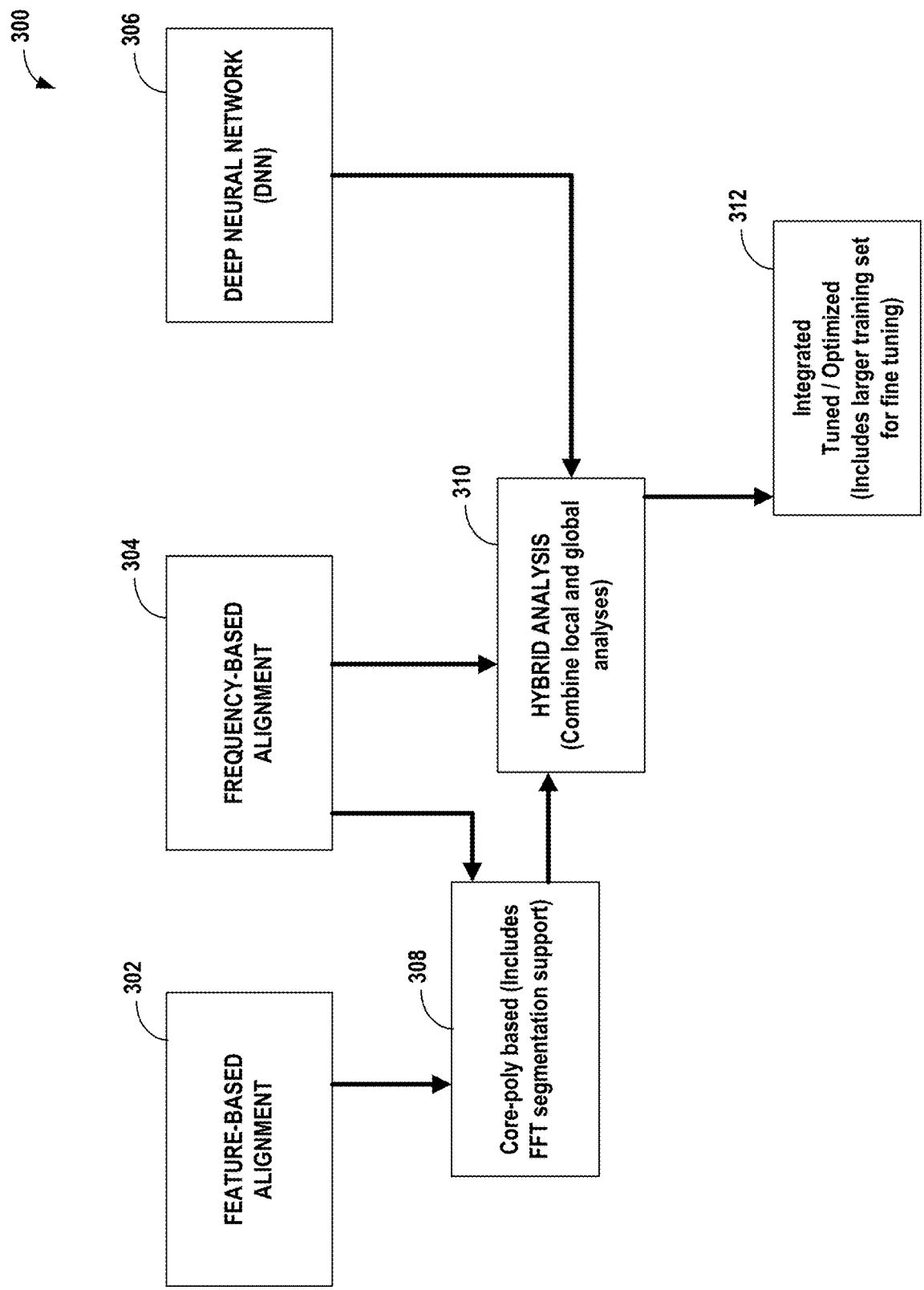
FIG. 3 is a flowchart illustrating a method of processing images of an integrated circuit, according to techniques of this disclosure.

FIG. 3 is a flowchart illustrating an example mode of operation for an image processor for processing images of an integrated circuit, according to techniques of this disclosure. The mode of operations 300 depicted in FIG. 3 includes three categories of image-processing algorithms. Feature-based image-alignment 302, such as may include distributed feature-matching and bundle adjusting that provides direct mapping from pixel to polygon. Feature-based matching requires tuning and calibration at each stage of processing, and therefore can be expensive or resource-intensive. However, some stages of feature-based algorithms may be accelerated on a graphics processing unit (GPU).

Frequency-based image alignment 304, such as extracting image frequency information with a Fast Fourier Transform, provides global image analysis that displays a high tolerance to local image noise. However, frequency-based image processing requires a relatively high number of similar cells to provide accurate clustering data. FFT computations may be optimized on GPUs. Core-poly based analysis 308 of the images may include FFT segmentation support.

As described herein, robust hybrid image analysis 310 combines pixel-based information with statistical-based information for alignment. This combines both the local and global analyses. As shown in FIG. 3, pixel-based information is gathered from feature-based image alignment 302. The phrase "pixel-based" refers to the fact that the analysis does not rely on an understanding of the structure itself. Some techniques of this disclosure further include structural-based information in combination with a frequency-based alignment algorithm component. Here, an image processor 118 may align and stitch images based on the matching frequency content of the images, i.e., the frequency information has codified information about the dominant structure beyond what is available in the feature-based approach.

A deep neural network (DNN) alignment component 306 gathers information about the actual circuit itself. DNN 306 aligns images based on object parts, e.g., integrated circuit structures and elements (e.g. interconnects, transistors, etc.). This DNN component 306 has the highest level of semantic information (e.g. actually encodes information about the circuit cells) to help in alignment. Machine-learning, such as with a DNN, is fully data-driven, and does not rely on repetitive grid patterns to produce accurate results. However, in order to function properly, a DNN requires an initial training data set, and may require calibration to confirm that the DNN has drawn correct inferences from the training data. Deep learning acceleration is already optimized on GPUs.

Alignment process 300 may further include integrated tuning and optimization 312, which may incorporate a larger training set for fine-tuning.

Figure 4:
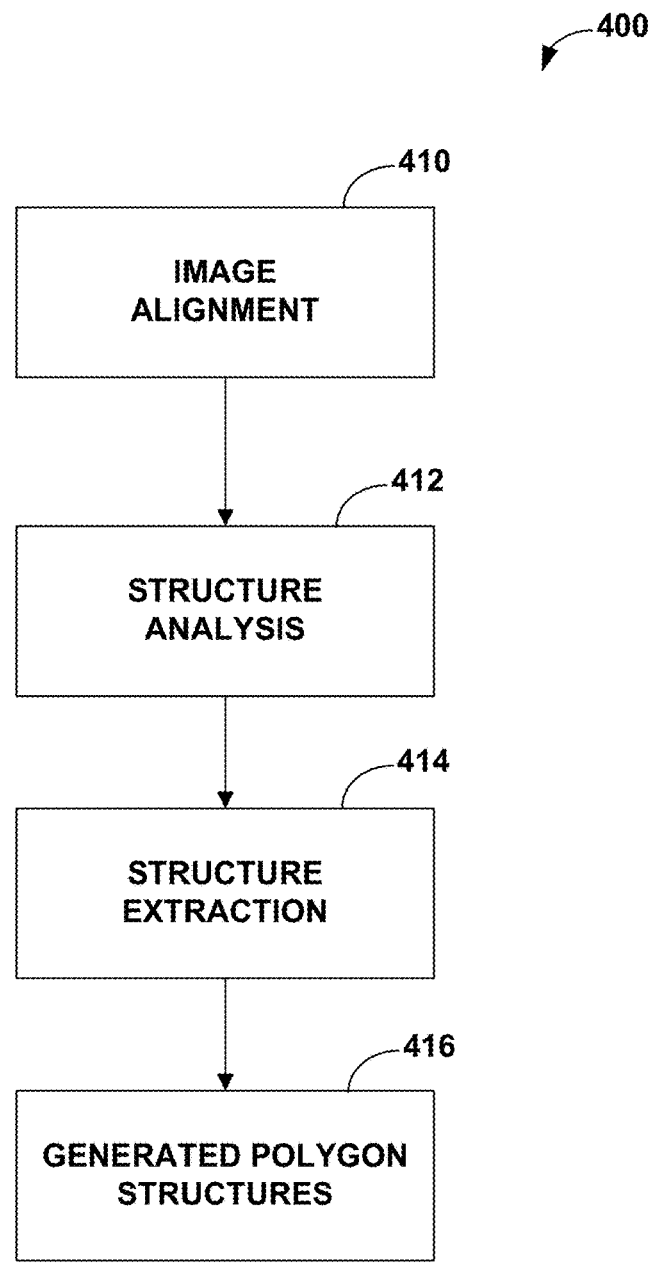
FIG. 4 is a flowchart depicting an image-processing pipeline for images of an integrated circuit, according to techniques of this disclosure.

FIG. 4 is a flowchart depicting an example image-processing pipeline 400 for processing images of an integrated circuit, according to techniques of this disclosure. The example method depicted in FIG. 4 may be performed computing device 106 (FIG. 1). In the example method depicted in FIG. 4, processing images of an integrated circuit includes feature-based image alignment (410). Feature-based image alignment may include distributed feature-point matching, detailed further in FIG. 5, as well as a bundle adjustment to reduce a net error associated with the alignment of the results of the feature-point matching.

Image-processing pipeline 400 may include structural analysis (412). Structural analysis may include, for example, extracting frequency data describing the frequency of repeated structures and patterns within the images of the integrated circuit. Consecutive images may be aligned in order to increase or maximize the consistency with frequency data for the rest of the image.

Image-processing pipeline 400 may include structure extraction (414). Structure extraction may include the use of machine-learning, such as a DNN, to identify expected structures within the chip images and align the images to produce those structures.

Finally, image-processing pipeline 400 may include outputting a composite image of an integrated circuit, displaying the internal circuit structure as a plurality of two-dimensional polygons (416). Each polygon may correspond to a different type of circuit structure, such as adder, multiplier, etc.

Figure 5:
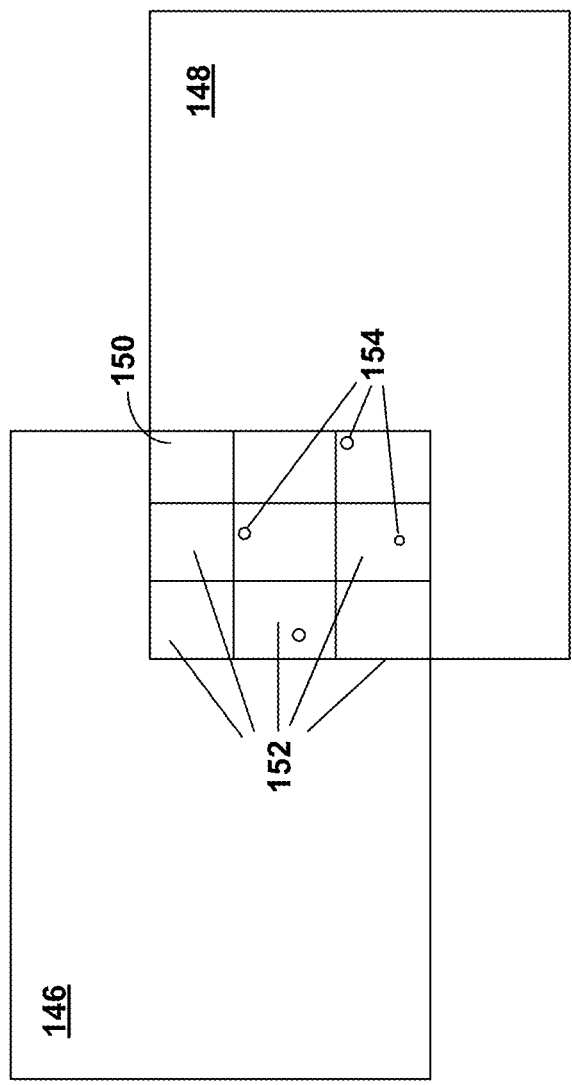
FIG. 5 is a block diagram illustrating distributed feature-matching of a pair of images of an integrated circuit, according to techniques of this disclosure.

FIG. 5 is a block diagram illustrating distributed feature-matching of a pair of images of an integrated circuit, as may be performed by tile generator 126, feature extractor 128, and/or feature matcher 130 of image processor 118 of FIG. 2, according to techniques of this disclosure. FIG. 5 depicts a pair of images 146, 148 selected from images 120 (FIG. 1). Image processor 118 may determine that image 146 has an overlapping region 150 with image 148, based on the images' microscope stage coordinates, indicating the position of the microscope stage with respect to ICD 108 (FIG. 1) when ICD 108 captured the images. Image processor 118 may align image 146 with image 148 by matching individual feature points 154 within overlapping region 150. According to some aspects of this disclosure, image processor 118 may increase the accuracy of the image alignment by using sampled feature points 154 that are distributed across the overlap regions 150, by partitioning overlap region 150 into a plurality or grid of tiles 152, and searching for at least one feature point 154 from every tile 152. Image processor 118 samples feature points across distributed tiles 152 because repeated patterns in integrated circuit images can "fool" matching points, and "noisy" patches on key dominant can throw off "ranking" (i.e., a confidence rating based on "distinctiveness") of feature points 154. In a traditional image-alignment algorithm, image processor 118 may use the strongest (i.e., most distinctive) feature points by first sorting the entire set of feature points 154 in the overlap regions 150. However, if there are repetitive circuit structures within the images, then it may be difficult for image processor 118 to disambiguate among the feature points 154. Also, if there are noisy patches (e.g., dust or other artifacts introduced by chip delayering, or electron discharge) then the list of feature points 154 may be skewed when considering the list as a whole.

Instead, by sampling the feature points 154 across tiles 152, image processor 118 enforces the need to selectively sample across the overlap regions such that there is sufficient distribution of unique feature points 154 for comparison. Image processor 118 (or a user) may determine the number of feature points 154 per tile region 152 as a threshold based on noise level of the imagery—i.e., image processor 118 may require more feature points for alignment when the images are noisy.

For each pair of overlapping images 146 and 148, image processor 118 may enhance image data to increase feature point detections (e.g., contrast enhancement, detailed in FIG. 8, below), detect feature points 154 evenly across overlap region 150 using tile-normalization, compute feature descriptors for each feature point, match corresponding feature pairs between images 146 and 148, apply symmetric match to reduce false matches, and apply motion and distance constraints to remove outliers.

Figure 6:
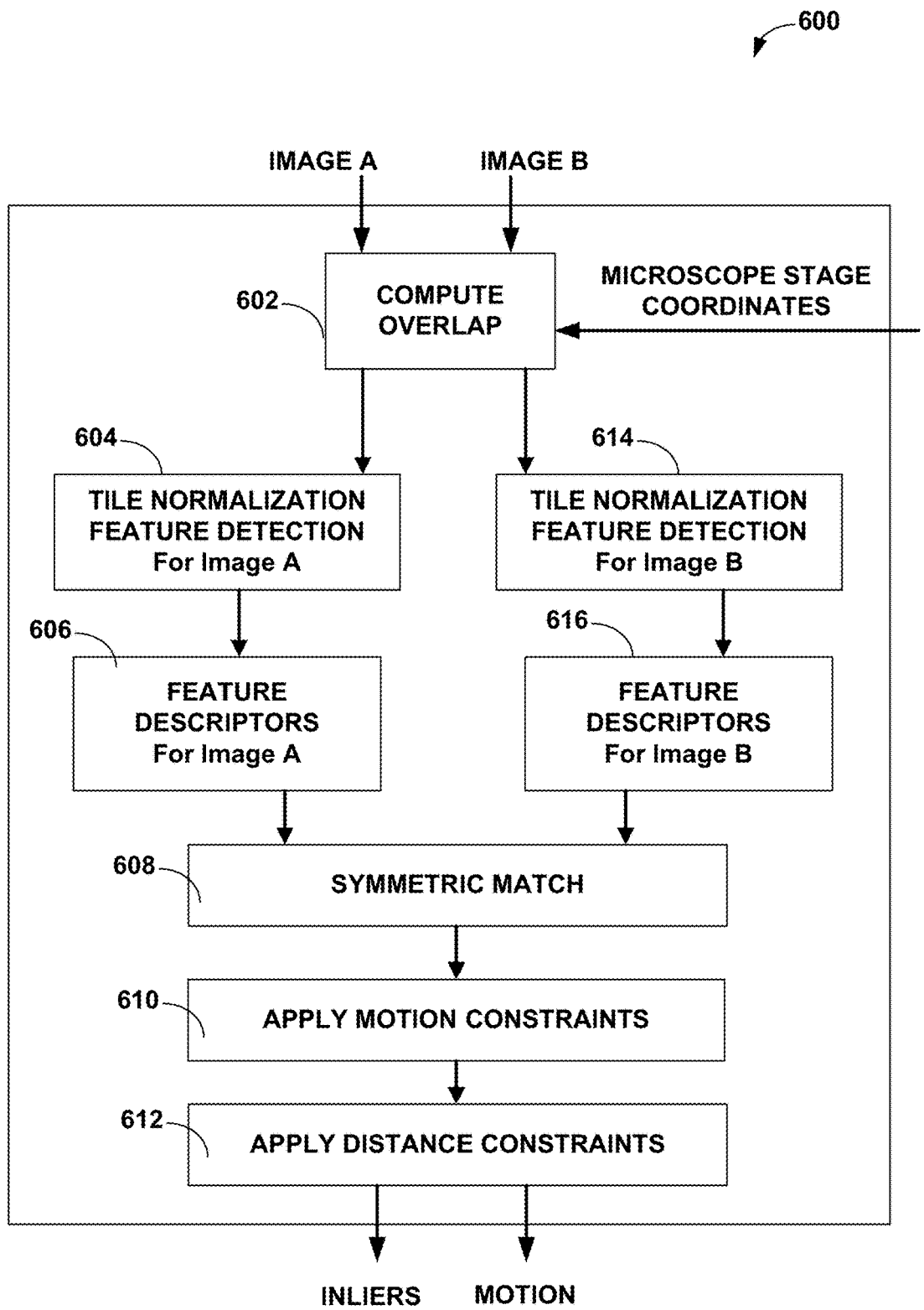
FIG. 6 is a flowchart illustrating a method of distributed-feature-matching a pair of images of an integrated circuit, according to techniques of this disclosure.

FIG. 6 is a flowchart illustrating an example mode of operation of distributed-feature-matching a pair of images "A" and "B" of an integrated circuit, according to techniques of this disclosure. First, an image processor computes an estimated overlap region for the two images, based on a set of image coordinates, such as a set of microscope stage coordinates (610). The image processor may partition the overlap region for each image into a plurality of normalized tiles, and then analyze each tile for one or more distinctive feature points (604, 614). Then, the image processor may compute a set of feature descriptors indicative of the identified feature points (606, 616). The image processor may perform symmetric matching between the identified feature points in Image A and the identified feature points in Image B (608)—i.e., the algorithm is run from A to B as well as from B to A, in order to reduce the number of false matches. Image processor may apply one or more motion constraints (610), limiting the displacement between two overlapping regions during alignment, as well as one or more distance constraints (612), limiting the displacement of any one particular image during alignment. The example operation depicted in FIG. 6 may output a set of global image coordinates comprising inliers (i.e., having excluded the "outlier" coordinates) and a description of the motion or displacement of each circuit image with respect to its initial microscope stage coordinates.

Figure 7:
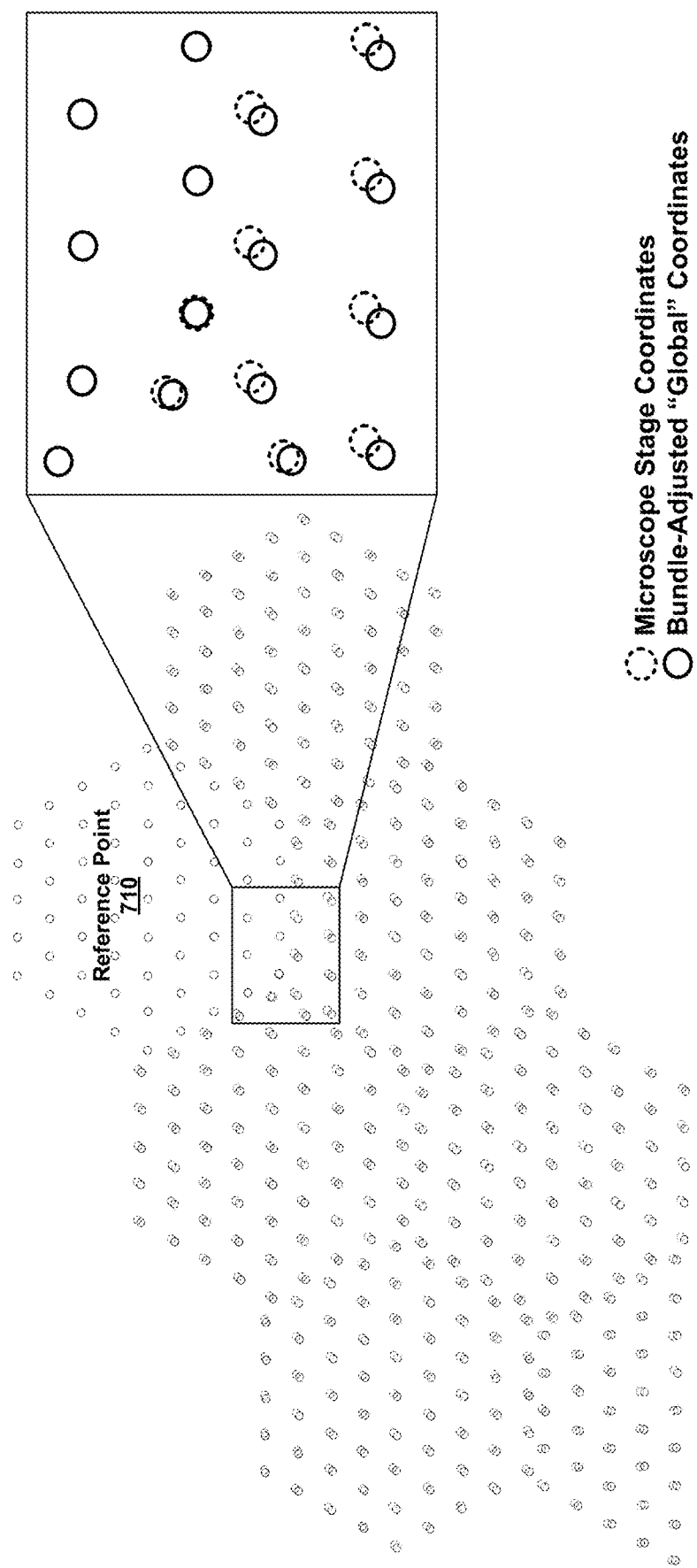
FIG. 7 depicts a bundle adjustment of pairwise registrations of images of an integrated circuit, according to techniques of this disclosure.

FIG. 7 depicts a bundle adjustment of pairwise registrations of images of an integrated circuit, as may be performed by bundle adjuster 132 of FIG. 2, according to techniques of this disclosure. Aligning and stitching images through feature-matching alone may result in a composite image with a number of visible "seams" between the individual images. These alignment discrepancies may be due in part to the repetitious nature of the circuits' internal structure. To address visible seams in the composite mosaic image, bundle adjuster 132 of image processor 118 (FIG. 2) may perform a bundle adjustment.

Bundle adjuster 132 finely tunes the registration parameters across multiple images as a bundle to refine the final registration result. Because most of the images have more than one overlapping neighbor, and not all image featured-based-matching registrations are correct, bundle adjustment may thus be used to improve, and in some cases optimize, the image stitching. In general, bundle adjustment refers to simultaneously refining the alignment results for each image in a bundle. The alignment coordinate refers to the 3D vector that provides the best alignment for the overlap region, and the net result of bundle adjustment is the best-fit adjustment based on minimizing the net error associated with the alignment of the images. Bundle adjuster 132 outputs the new global coordinates of all images.

In some examples, to determine the global coordinates of each image, bundle adjuster 132 solves the following optimization problem:

$$\operatorname*{argmin}_{\vec{x}} \left[ \sum_{a,b \in overlap} w_{ab}(R_{ab}\vec{x}_a - \vec{x}_b - \vec{t}_{ab})^2 + \beta \sum_i (\vec{x}_i - \vec{s}_i)^2 \right]$$

where $\vec{x}_i$ is the coordinate of image i, and $R_{ab}$ and $\vec{t}_{ab}$ are the rotation matrix and translation vector from image a to image b. $\vec{s}_i$ is the reference coordinate (or fiducial point) for image i. These fiducial points are predetermined points as a reference to the circuits. β is the regularization parameter, which controls how much influence $\vec{s}_i$ has. $w_{ab}$ is the weight for the motion estimate between image a and b. By weighting the motion estimates, the bundle adjuster 132 performs a weighted bundle adjustment that biases adjustments indicated by better pair matches. The weight may correspond to the confidence rating determine by feature matcher 130. For example, in some cases, the number of matches in a pairwise registration constitutes the weight for the translation vector of the pairwise registration. In general, bundle adjuster 132 adjusts the transformation with the greatest weight by the least amount.

This bundle adjustment may consist of an iterative refinement of the relative motion parameters for a group of images. The first bundle adjustment may include the refinement of the relative motions among a set of subfield images. The second bundle adjustment may be applied to a region which includes hundreds and thousands of microscope images. The refinement can be extended to a physical layer or the entire layer of many physical layers. FIG. 7 depicts an example of the results of bundle adjuster 132. Dashed circles represent the initial microscope stage coordinates for each image. Solid circles represent the final bundle-adjusted coordinates for each image within the final composite image. Reference point 710 is the fiducial point at the microscope image coordinates stay unchanged.

Figure 8:
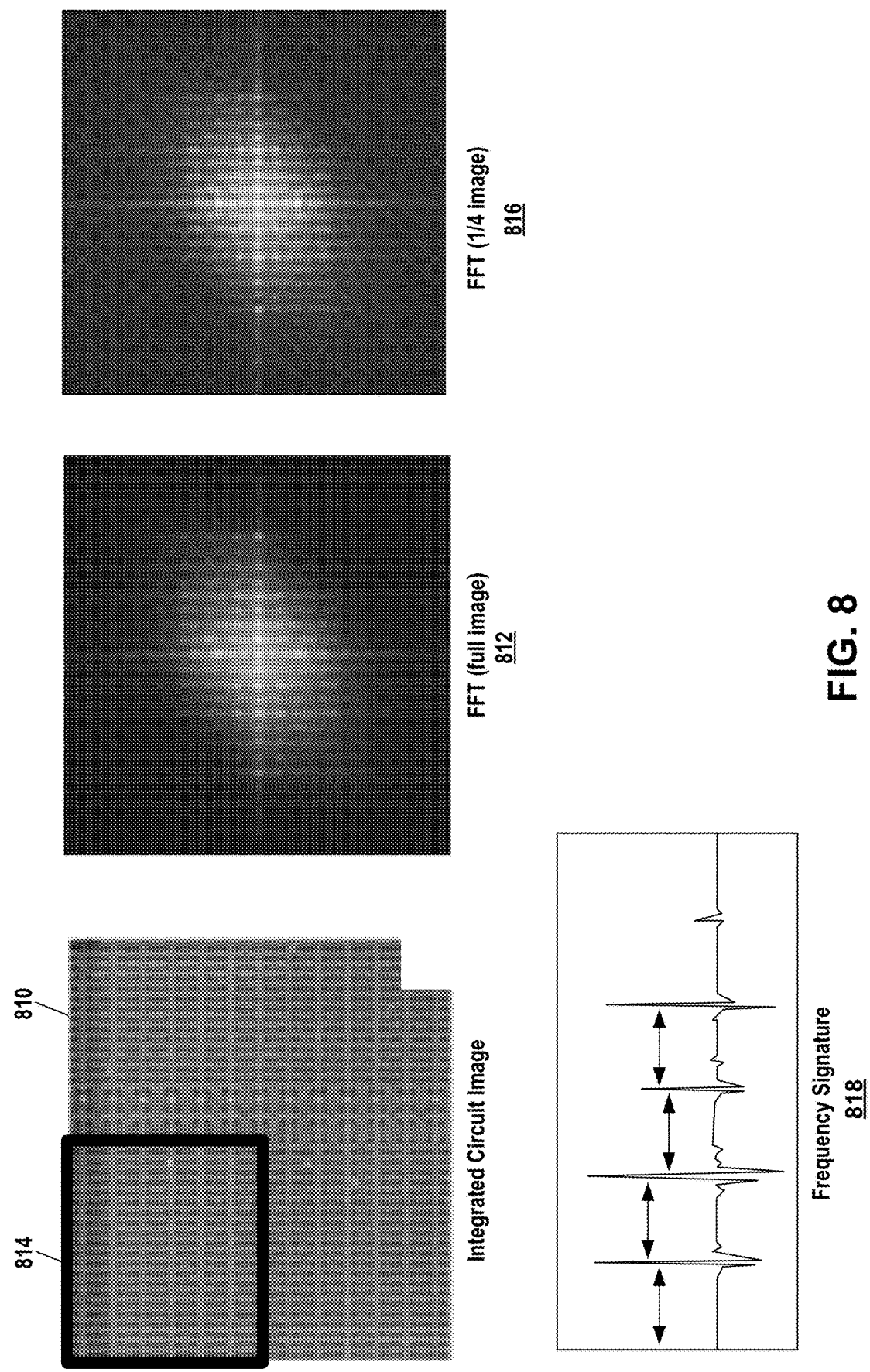
FIG. 8 depicts a frequency analysis of images of an integrated circuit, according to techniques of this disclosure.

FIG. 8 depicts a frequency analysis of images of an integrated circuit, as may be performed by frequency analyzer 134 of FIG. 2, according to techniques of this disclosure. In addition to performing distributed feature-matching and a bundle adjustment, frequency analyzer 134 may increase the accuracy of the image alignment by performing a frequency analysis on images 120. For example, frequency analyzer 134 may extract structural-based information from the circuit images by computing a Fast Fourier Transform (FFT) for images 120. The frequency information has codified information about the dominant structure beyond what is available in the feature-based alignment modules. Frequency analyzer 134 may conduct an FFT analysis over the larger image regions instead of the overlap regions 150 (FIG. 5). Image processor 118 may then align and stitch images in part based on matching frequency content of overlapping images, or alternatively, eliminate previously determined alignments revealed to have inconsistent frequency content.

The example of FIG. 8 depicts a computed 2-dimensional FFT 812 for image 810 (one of images 120 of FIG. 2). A similar FFT 816 computed over a smaller sub-region 814 of image 812 will often result in a similar frequency signature 818 as FFT 812, because the circuit layout is highly repetitive, and circuits are often structured around a grid during manufacturing. Image processor 118 may use the frequency information to align signal peaks (e.g. along the x and y dimensions) based on the grid structure. In contrast to the pixel-level operations of feature-based alignment, image processor 118 may perform frequency-based alignment at a more global scale (i.e., at the scale of entire images). Frequency analysis provides information about circuit-cell repetition, though not the actual contents of the cells.

In some examples, frequency analyzer 134 may also perform an initial frequency analysis to enhance low-contrast circuit images, in which the original circuit image may be too visually dark, obscuring most feature points and inhibiting feature extraction. A simple histogram equalization may not be able to enhance all of the edge information in the image. Instead, using a contrast normalization step, the image processor 118 can enhance the contrast of all high-frequency content in the image so as to provide strong feature points for stitching.

Figure 9:
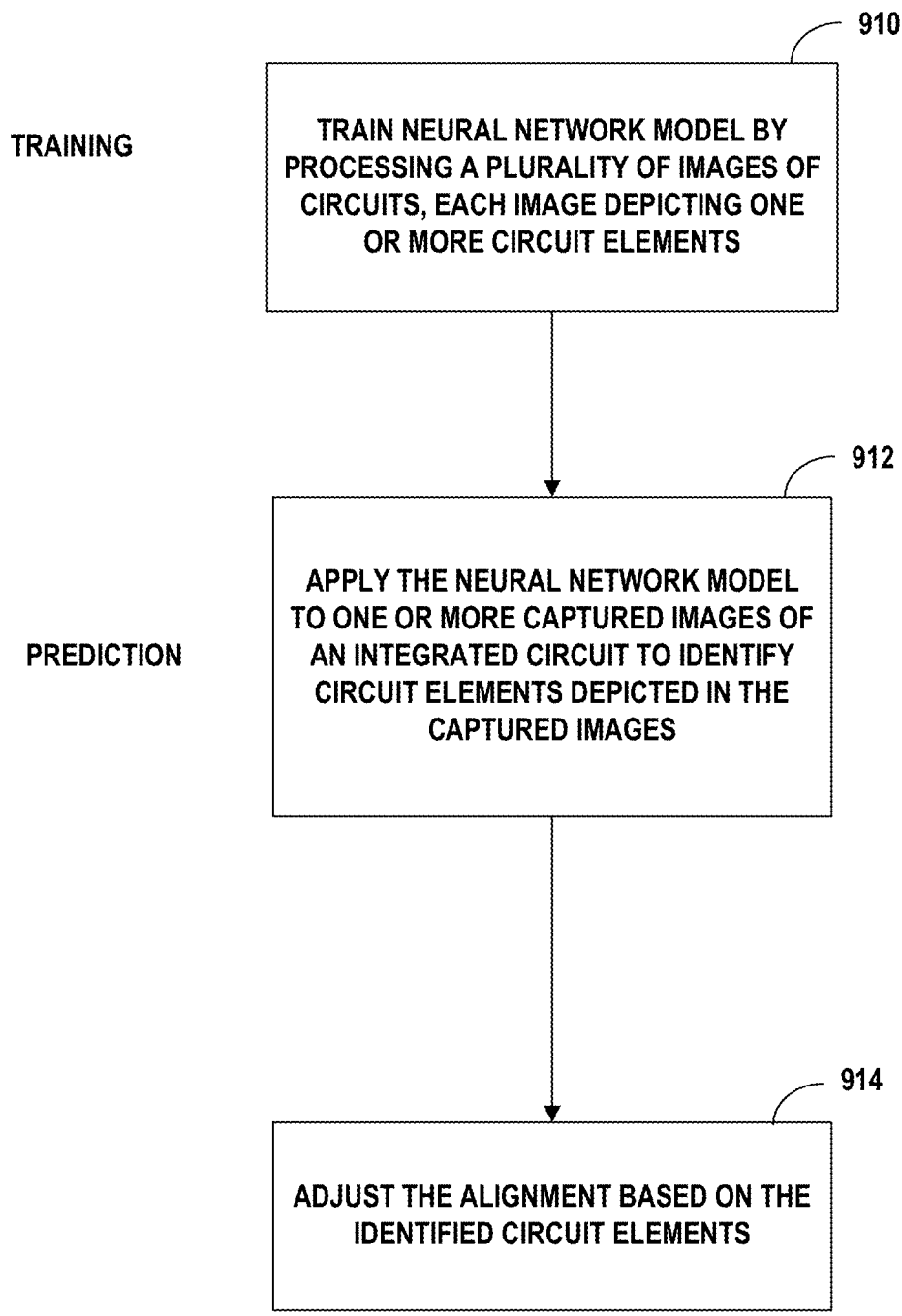
FIG. 9 is a flowchart depicting a method of aligning images of an integrated circuit using a Deep Neural Network (DNN), according to techniques of this disclosure.

FIG. 9 is a flowchart depicting a method of aligning images of an integrated circuit using a Deep Neural Network (DNN) 136 of FIG. 2, according to techniques of this disclosure. Image processor 118 may implement a machine-learning approach to "learn" about individual circuit structures, and use the learned information for image alignment. For example, image processor 118 may implement a DNN 136 that is trained using data sets from circuit-cell image libraries, available from semiconductor fabrication companies, for instance (910). These cell libraries have identified patterns and shapes corresponding to each different circuit function (e.g. AND, NAND, NOR, XOR). Once trained, DNN 136 can correctly identify the circuit pattern associated with each cell. Any seams created during image stitching may be resolved by pattern-matching against the outputs of DNN 136. For example, DNN 136 may specify the expected shape (912), and image processor 118 may then adjust or refine the translation, rotation, and/or scaling parameters of the image being stitched to match the expected shape (914). DNN 136 may align images based on circuit sub-components, such as, interconnects, transistors, etc. Accordingly, DNN 136 has the highest level of semantic information in that it actually encodes information about the circuit cells to aid in alignment.

Figure 10:
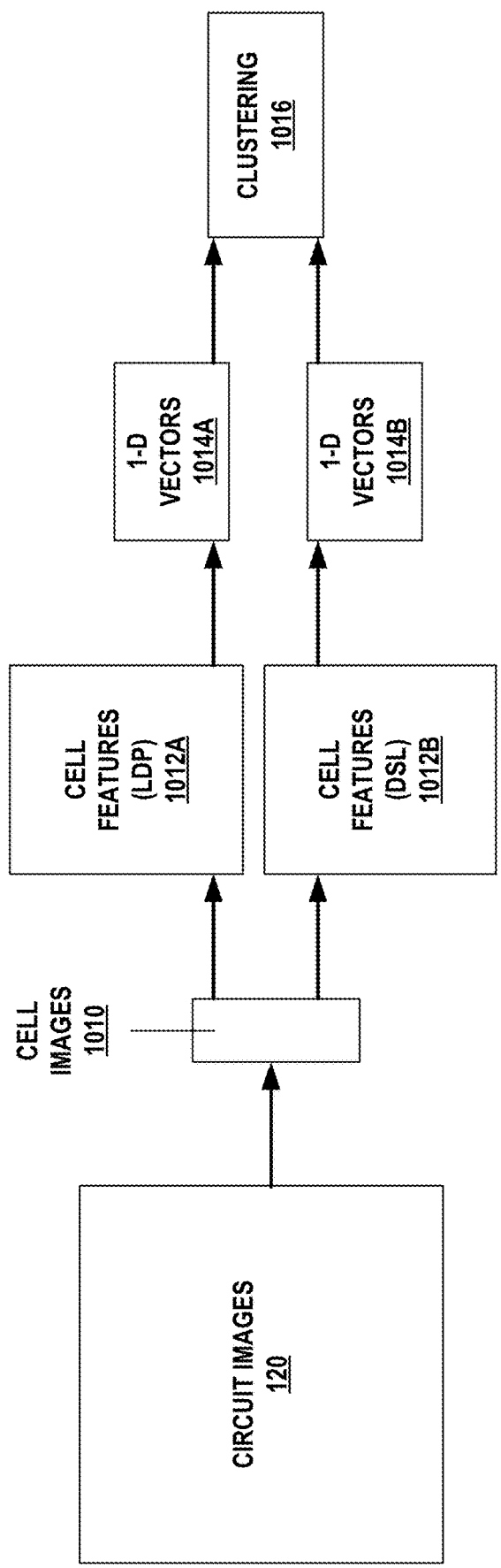
FIG. 10 is a flowchart illustrating a method of aligning images of an integrated circuit using frequency analysis to generate a set of training data for a DNN, according to techniques of this disclosure.

FIG. 10 is a flowchart illustrating a method of aligning images of an integrated circuit using frequency analysis to generate a set of training data for a DNN, according to techniques of this disclosure. In some examples, rather than using a circuit image library as a training set, DNN 136 may instead use frequently-occurring circuit-cell structures within the same integrated circuit images 120 that are currently being aligned. For example, DNN 136 may work in conjunction with a frequency-analysis module to determine common patterns of cells within the circuit, and then align images 120 to match these frequent cell patterns. In one example, image processor 118 (FIG. 2) may use either Local Binary Pattern (LDP 1012A) (local gradient based on intensity) or Descriptors for Shape and Letters (DSL 1012B) (pattern- and location-specific), as a vector description of any grid region. Then, image processor 118 may implement a clustering method to identify common cell patterns. Finally, using these common cell patterns, image processor 118 may align images based on the expected shapes and/or patterns of circuits.

In some examples, DNN 136 may also work in conjunction with a frequency analysis 134 to resolve imaging noise, relying on the repetitious nature of circuit structures. Once image processor 118 has identified cell structures (as described above), image processor 118 may then determine a list of reference cells (e.g., the most representative cells, in the center of the cluster of similar cells). Image processor 118 may then designate any outlier cells (e.g. ones with a noisy patch) as anomalies and correct them using the reference cells as a guide. Any cell that has a non-aligned seam can also be treated as an anomaly, and thus, image processor 118 can then adjust/refine the motion parameters of the image being stitched to match the expected shape from the reference cells.

Figure 11:
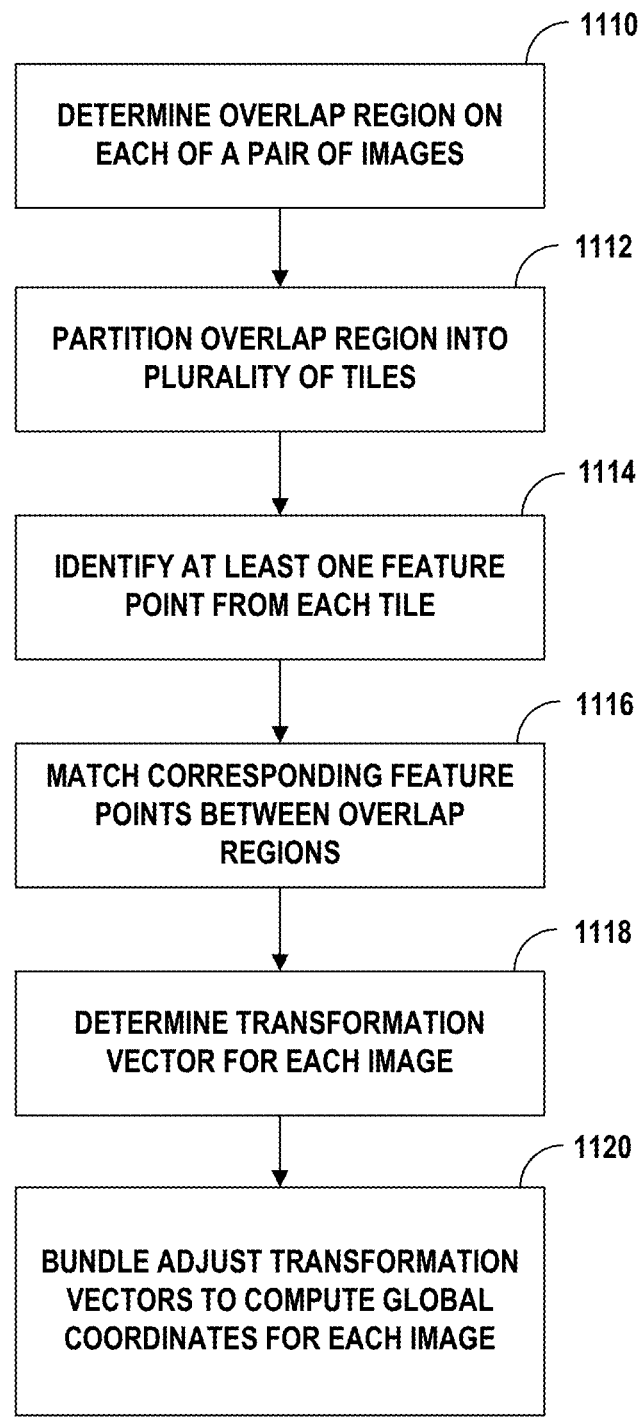
FIG. 11 is a flow chart depicting a method of processing images of an integrated circuit, according to techniques of this disclosure.

FIG. 11 is a flow chart depicting a method of processing images of an integrated circuit, according to techniques of this disclosure. An image processor, such as a set of executable instructions within a computing device, receives two or more images depicting overlapping sections of an integrated circuit. The image processor, based on a respective set of microscope stage coordinates associated with each image, determines an approximate overlapping region in each image 1110).

The image processor may partition each overlap region into a plurality of tiles from which to search for distinctive feature points (1112). In order to improve the accuracy of alignment, the image processor may be configured to identify at least one feature point from every tile in the respective overlap region (1114). Then, for each pair of overlapping images, the image processor attempts to match feature points from the first overlapping region on the first image with feature points from the second overlapping region on the second image, and align the two images so that matched feature points are precisely aligned (1116). The alignment, based on matched feature points, results in a set of pairwise registrations comprising a set of translation vectors, indicating a magnitude and a direction by which to translate each image, from its initial stage coordinates, to the aligned position (1118). In some examples, the set of translation vectors may also be assigned a confidence rating based on the strength and/or number of matched feature points generating that respective vector. To reduce a net error, or inconsistencies, among two or more pairs of translation vectors, image processor may perform a bundle adjustment on the pairs of overlapping images (1120). The bundle adjustment may be weighted by confidence ratings for pairwise images, e.g., based on metadata from the feature-matching indicating the number of matches, the effect of one or more constraints, and so forth. For example, image processor 118 may adjust or refine the translation vector for one or more images based on the number or degree of inconsistencies associated with the respective image, and/or based on the determined confidence ratings associated with the image. The bundle adjustment results in a set of global image coordinates, from which the image processor may stitch the individual images into a single composite image of the circuit.

The techniques of this disclosure may be amenable to applications beyond trusted hardware. For example, electron microscopes have been used to take images of body tissue and in particular brain cells. The application there include the study of the neurons and synaptic connections. The need is similar in that the images are low contrast, have highly repetitive structures, and are composed of many stitched seams. The proposed algorithm can be used in those applications as well.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., per a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent processing, integrated and/or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method of stitching images to generate a composite image of an object, comprising:
by a computing system, for each pair of two or more pairs of the images:
partitioning a first overlap region of a first image of the pair into a first plurality of grid tiles and partitioning a second overlap region of a second image of the pair into a second plurality of grid tiles, the first overlap region and the second overlap region being overlapping regions of the first image and the second image;
extracting at least one feature point from each of the first plurality of grid tiles and at least one feature point from each of the second plurality of grid tiles, wherein the feature point defines a feature on an image, the feature being on a submicron or nanoscale level;
determining corresponding feature points between the at least one feature point of the first overlap region and the at least one feature point of the second overlap region; and
aligning the first image with the second image based on the corresponding feature points to determine at least one transformation matrix for the pair for transforming the first overlap region of the first image to the second overlap region of the second image;
computing, by the computing system based on the respective at least one transformation matrices for the two or more pairs, global coordinates for each of the images by performing a bundle adjustment for at least two of the two or more pairs of the images to reduce a net error associated with the alignment of the images;
stitching, by the computing system, the images based on the respective global coordinates for the images to generate the composite image; and
outputting, by the computing system, at least one of the composite image and the respective global coordinates for the images.

2. The method of claim 1, further comprising:
determining, by the computing system for a first pair of the two or more pairs of the images, that less than a threshold number of feature points are in at least one of the first plurality of grid tiles for the first image of the first pair or the second plurality of grid tiles for the second image of the first pair; and
expanding, by the computing system, the first overlap region into an expanded first overlap region and the second overlap region into a second expanded overlap region,
wherein partitioning the first overlap region and the second overlap region comprises partitioning the expanded first overlap region and the expanded second overlap region.

3. The method of claim 1, further comprising:
determining, for each pair of the two or more pairs of images, a confidence rating based at least in part on the corresponding feature points,
wherein performing the bundle adjustment comprises computing the global coordinates based at least in part on the confidence rating.

4. The method of claim 1, wherein performing the bundle adjustment comprises applying a neural network having a model trained to identify images of integrated circuit elements to align misaligned portions of an integrated circuit element distributed among two or more images.

5. The method of claim 1, further comprising:
computing, by the computing system, a systematic error in image alignment caused by stage motion by a stage supporting the object,
wherein computing the global coordinates for each of the images comprises computing, by the computing system based at least in part of the systematic error in image alignment, the global coordinates for each of the images.

6. The method of claim 1, wherein performing the bundle adjustment comprises excluding a pair of images from the bundle adjustment when a motion specified by the at least one transformation matrix for the pair of images exceeds a motion constraint.

7. The method of claim 6, further comprising:
determining, by the computing system, for one of the at least two distinct composite images, whether a motion specified by the at least one transformation matrix for a first pair of the images is larger than a threshold; and excluding the first pair of images from the bundle adjustment as an outlier in response to determining the motion specified by the at least one transformation matrix for the first pair of the images is larger than the threshold.

8. The method of claim 7, wherein the threshold is based at least in part on a set of microscope stage coordinates.

9. The method of claim 1, further comprising:
computing, by the computing system, a Fast Fourier Transform (FFT) to determine global frequency data for the composite image,
wherein outputting the composite image comprises outputting the composite image only if the global frequency data indicates integrated circuit elements of the composite image are globally consistent.

10. The method of claim 1, wherein each of the at least one transformation matrices is one of a translation matrix, a rotation matrix, or a scale matrix.

11. An integrated circuit imaging system comprising:
an image-capture device configured to capture images of an integrated circuit; and
a computation engine executing on one or more processors and configured to, for each pair of two or more pairs of the images:
partition a first overlap region of a first image of the pair into a first plurality of grid tiles and partition a second overlap region of a second image of the pair into a second plurality of grid tiles, the first overlap region and the second overlap region being overlapping regions of the first image and the second image;
extract at least one feature point from each of the first plurality of grid tiles and at least one feature point from each of the second plurality of grid tiles, wherein the feature point defines a feature on an image, the feature being on a submicron or nanoscale level;
determine corresponding feature points between the at least one feature point of the first overlap region and the at least one feature point of the second overlap region; and
align the first image with the second image based on the corresponding feature points to determine at least one transformation matrix for the pair for transforming the first overlap region of the first image to the second overlap region of the second image,
wherein the computation engine is further configured to compute, based on the at least one transformation matrices for the two or more pairs, global coordinates for each of the images by performing a bundle adjustment for at least two of the two or more pairs of the images to reduce a net error associated with the alignment of the images,
wherein the computation engine is further configured to stitch the images based on the respective global coordinates for the images to generate a composite image, and
wherein the computation engine is further configured to output at least one of the composite image and the respective global coordinates for the images.

12. The system of claim 11, wherein the computation engine is further configured to:
determine, for a first pair of the two or more pairs of the images, that less than a threshold number of feature points are in at least one of the first plurality of grid tiles for the first image of the first pair or the second plurality of grid tiles for the second image of the first pair; and expand the first overlap region into an expanded first overlap region and the second overlap region into a second expanded overlap region,
wherein partitioning the first overlap region and the second overlap region comprises partitioning the expanded first overlap region and the expanded second overlap region.

13. The system of claim 11, wherein the computation engine is further configured to determine, for each pair of the two or more pairs of images, a confidence rating based at least in part on the corresponding feature points,
wherein performing the bundle adjustment comprises computing the global coordinates based at least in part on the confidence rating.

14. The system of claim 11, wherein the computation engine is configured to perform the bundle adjustment by applying a neural network having a model trained to identify images of integrated circuit elements to align misaligned portions of an integrated circuit element distributed among two or more images.

15. The system of claim 11, wherein the computation engine is further configured to:
compute a systematic error in image alignment caused by stage motion by a stage supporting the object,
wherein to compute the global coordinates for each of the images the computation engine is configured to compute, based at least in part of the systematic error in image alignment, the global coordinates for each of the images.

16. The system of claim 11, wherein the computation engine is further configured to performing the bundle adjustment comprises excluding a pair of images from the bundle adjustment when a motion specified by the at least one transformation matrix for the pair of images exceeds a motion constraint.

17. The system of claim 16, wherein the computation engine is further configured to:
determine, for one of the at least two distinct composite images, whether a motion specified by the at least one transformation matrix for a first pair of the images is larger than a threshold; and
exclude the first pair of images from the bundle adjustment as an outlier in response to determining the motion specified by the at least one transformation matrix for the first pair of images is larger than the threshold.

18. The system of claim 17, wherein the threshold is based at least in part on a set of microscope stage coordinates.

19. The system of claim 16, wherein the computation engine is further configured to:
compute a Fast Fourier Transform (FFT) to determine global frequency data for the composite image,
wherein outputting the composite image comprises outputting the composite image only if the global frequency data indicates integrated circuit elements of the composite image are globally consistent.

20. A non-transitory computer-readable medium comprising instructions that, when executed, cause one or more processors to execute a computation engine configured to:
for each pair of two or more pairs of images of an integrated circuit:
partition a first overlap region of a first image of the pair into a first plurality of grid tiles and partition a second overlap region of a second image of the pair into a second plurality of grid tiles, the first overlap region and the second overlap region being overlapping regions of the first image and the second image;

extract at least one feature point from each of the first plurality of grid tiles and at least one feature point from each of the second plurality of grid tiles, wherein the feature point defines a feature on an image, the feature being on a submicron or nanoscale level;

determine corresponding feature points between the at least one feature point of the first overlap region and the at least one feature point of the second overlap region; and align the first image with the second image based on the corresponding feature points to determine at least one transformation matrix for the pair for transforming the first overlap region of the first image to the second overlap region of the second image;

wherein the instructions further cause the one or more processors to execute the computation engine to:

compute, based on the respective at least one transformation matrices for the two or more pairs, global coordinates for each of the images by performing a bundle adjustment for at least two of the two or more pairs of the images to reduce a net error associated with the alignment of the images;

stitch the images based on the respective global coordinates for the images to generate the composite image; and output at least one of the composite image and the respective global coordinates for the images.

\* \* \* \* \*